United States Patent
Gao et al.

(10) Patent No.: US 6,707,890 B1
(45) Date of Patent: Mar. 16, 2004

(54) VOICE MAIL NOTIFICATION USING INSTANT MESSAGING

(75) Inventors: Xiaofeng Gao, Alpharetta, GA (US); Maria Adamczyk, Alpharetta, GA (US); Karen Mullis, Loganville, GA (US)

(73) Assignee: Bell South Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/232,749

(22) Filed: Sep. 3, 2002

(65) Prior Publication Data (65)

(51) Int. Cl.[7] .................................................. H04M 1/64
(52) U.S. Cl. ............... 379/88.12; 379/88.22; 709/206
(58) Field of Search .................. 379/88.12, 88.22; 455/413, 412, 435

(56) References Cited

U.S. PATENT DOCUMENTS

2002/0077082 A1 * 6/2002 Cruickshank ............... 455/413
2002/0087643 A1 * 7/2002 Parsons et al. ............. 709/206
2002/0173308 A1 * 11/2002 Dorenbosch et al. ....... 455/435
2002/0181673 A1 * 12/2002 Henry et al. ............. 379/88.22
2003/0147512 A1 * 8/2003 Abburi .................... 379/88.22

* cited by examiner

Primary Examiner—Fan Tsang
Assistant Examiner—Olisa Anwah
(74) Attorney, Agent, or Firm—Shaw Pittman LLP

(57) ABSTRACT

A system and method that notifies a voice mailbox subscriber of the receipt of a message at a voicemail server using instant messaging. A preferred embodiment of the invention includes an enhanced notification server that receives a notification of the message from the voicemail server, queries the availability of an instant messaging client via an instant messaging presence server, and forwards the notification to the instant messaging client via the instant messaging presence server if the instant messaging client is available. In preferred embodiments, provisions are made to forward the message to the subscriber via instant messaging.

20 Claims, 6 Drawing Sheets

VOICE MAIL NOTIFICATION USING INSTANT MESSAGING

The present invention relates generally to the field of voicemail message management and, more particularly, to systems and methods for notifying an instant messaging client of messages received at a voicemail server.

BACKGROUND OF THE INVENTION

Most, if not all, telephone users have at least one voice mailbox in which callers can leave voice messages when the users are unavailable to answer calls. Voicemails are typically retrieved by the users in a number of ways. For example, using a telephone set in her office, a voicemail user who returns from a lunch break can hear voicemails that were left at her voice mailbox while she was at lunch. Alternatively, the voicemail user could remotely dial in (e.g., from her home or while she is out of town) to her voice mailbox to retrieve the voicemail messages. Regardless of the method used, the voicemail user must first access her voicemail server to determine whether or not a new message has been stored in her voice mailbox since the last time she checked the mailbox. This can be inconvenient to the user.

Accordingly, there is a need for a system and method that would notify the user instantaneously when a voicemail has arrived at her voice mailbox.

SUMMARY OF THE INVENTION

The present invention is a system and method that provides enhanced notification of messages received by a voicemail server using instant messaging. In a preferred embodiment, the invention provides an enhanced notification server that works with a voicemail server and an instant messaging presence server to notify an instant messaging client of messages received at the voicemail server. When a new message, e.g., a voicemail, a fax message, or the like, intended for a subscriber of a voice mailbox is received, the voicemail server sends a notification to the enhanced notification server. The enhanced notification server then queries the instant messaging presence server to determine whether the voice mailbox subscriber (who is also the instant messaging client) is available. "Available" means the instant messaging client is online, engaged in an instant messaging session, or otherwise logged on to the instant messaging presence server. If the instant messaging client is available, the enhanced notification server forwards the notification to the instant messaging client. Preferably, forwarding of the notification to the instant messaging client (the voice mailbox subscriber) is accomplished via the instant messaging presence server. The enhanced notification server queues the notification for a later delivery if the instant messaging client is not available.

In another preferred embodiment, the invention provides a method for notifying an instant messaging client of messages received by a voicemail server of which the instant messaging client is a voice mailbox subscriber. The methods include the following steps. First, when the voicemail server receives a message, e.g., a voicemail, a fax message, and the like, which is intended for the instant messaging client, the voicemail server sends a notification to an enhanced notification server. The notification indicates that a new message is available on the voicemail server for retrieval. The enhanced notification server then queries an instant messaging presence server whether the instant messaging client is available. If the voice mailbox subscriber (who is also the instant messaging client) is available, the enhanced notification server forwards the notification to the instant messaging presence server, which in turns forwards the notification to the instant messaging client using known instant messaging technologies.

In other embodiments, the invention can be adapted to forward the incoming message to the voice mailbox subscriber via instant messaging.

DETAILED DESCRIPTION OF THE INVENTION

Figure 1:
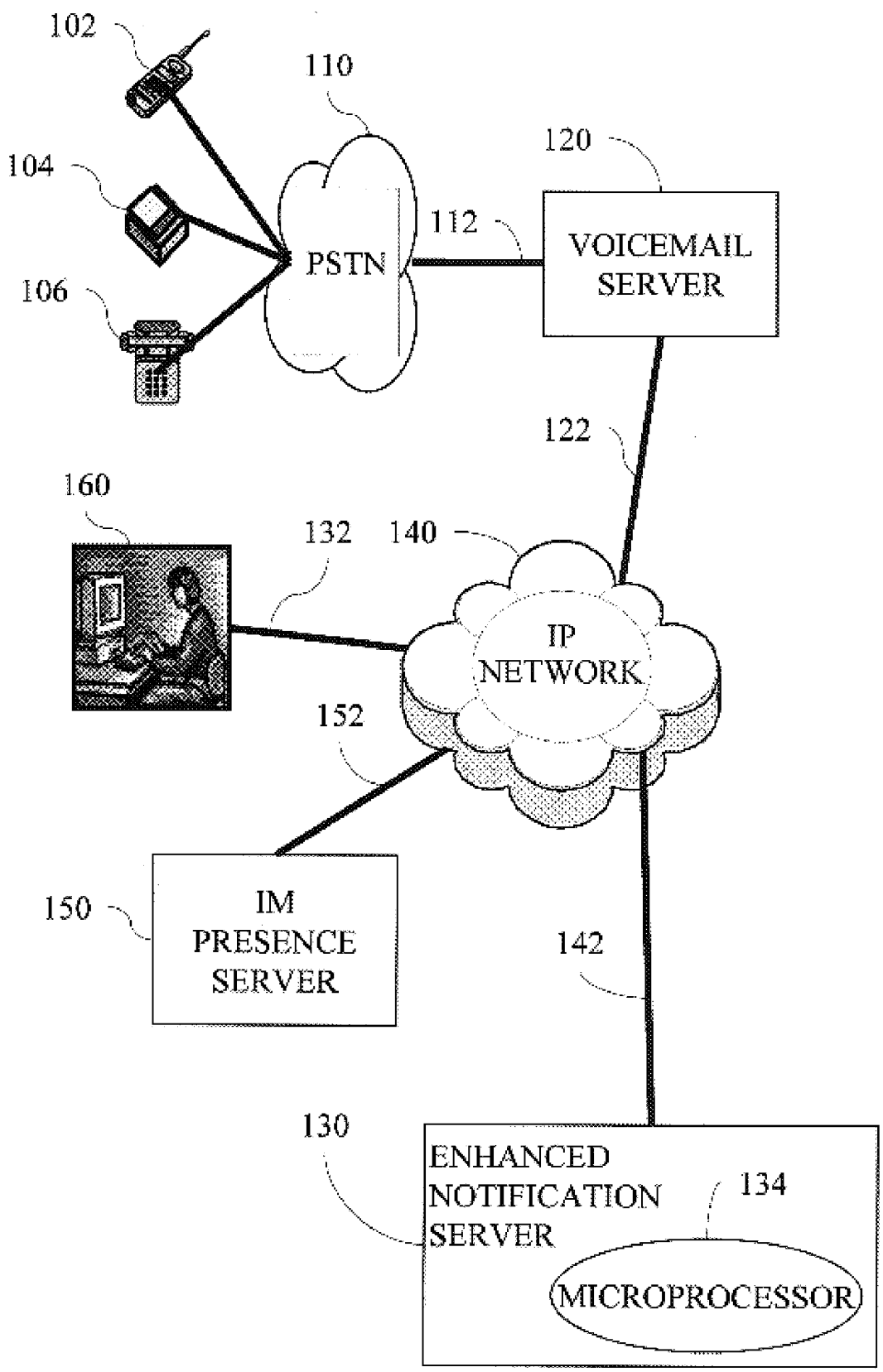
FIG. 1 is a schematic diagram showing the system architecture used in a preferred embodiment of the invention.

FIG. 1 is a schematic diagram showing the system architecture used in a preferred embodiment of the invention. PSTN 110, voicemail (VM) server 120, IP network 140, and instant messaging (IM) presence server 150 are known elements in the art. As shown in FIG. 1, PSTN 110 is accessible to users via one or more of wireless telephone 102, fax machine 104, and wireline telephone 106. Although not indicated in FIG. 1, PSTN 100 can be accessible to other telecommunications devices including, for example, a computer with a modem, an interactive pager, a personal digital assistant, and the like.

As known in the art, voicemail server 120 can receive voicemail, fax messages, and the like from various sources including, for example, PSTN 110, through link 112.

Voicemail server 120 is in communication with IP network 140 via link 122. Voicemail server 120 and IP network 140 can communicate with each other using known protocols, including, for example, TCP/IP.

Preferably, voicemail server 120 is adapted to provide traditional voicemail features as well as new features. Voicemail server 120 preferably includes a profile for each of its voice mailbox subscribers regarding how notification of incoming messages should be performed. Preferably, voicemail server 120 is adapted to initiate the notification by communicating with enhanced notification server 130. Communications between voicemail server 120 and enhanced notification server 130 can be accomplished via IP network 140 and links 122 and 142.

As known in the art, there are a number of different protocols used by different instant messaging service providers. For example, each of AOL, Yahoo!, and MSN uses its own protocol for its instant messaging service. Accordingly, communication sessions between enhanced notification server 130 and instant messaging presence server 150 is facilitated by the appropriate protocol associated with instant messaging presence 150.

Preferably, enhanced notification server 130 includes microprocessor 134. Microprocessor 134 is preferably adapted to provide a number of functionalities. For example, in a preferred embodiment of the invention, enhanced notification server 130 can query instant messaging presence server 150 whether instant messaging client 160 is available. For example, enhanced notification server 130 can query instant messaging presence server 150 whether instant messaging client 160 (voicemail subscriber) has an active instant messaging session. If instant messaging client 160 is available, enhanced notification server 130 forwards the notification to instant messaging client 160. The notification is preferably forwarded via IP network 140 and instant messaging presence server 150 through links 142, 152, and 132.

Figure 2:
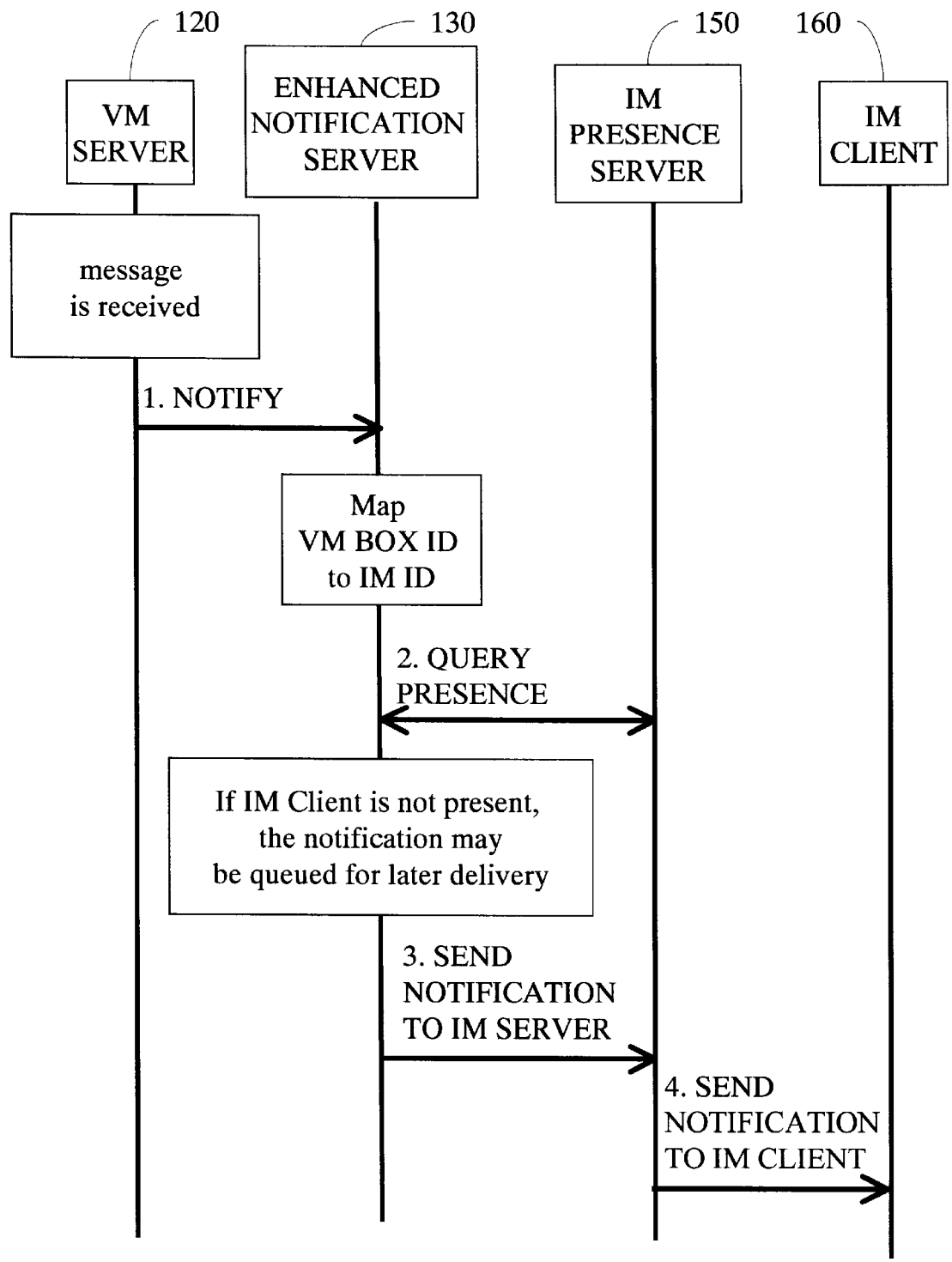
FIG. 2 is a schematic diagram summarizing the sequence of activities of a preferred embodiment that involves a voicemail server, an enhanced notification server, an instant messaging presence server, and an instant messaging client.

FIG. 2 is a schematic diagram summarizing the sequence of activities involving voicemail server 120, enhanced notification server 130, instant messaging presence server 150, and instant messaging client 160. As shown in FIG. 2, communications between enhanced notification server 130 and instant messaging presence server 150 include multiple queries and responses regarding the presence or availability of instant messaging client 160. Additional details regarding FIG. 2 are explained in conjunction with the description of FIG. 3 below.

Figure 3:
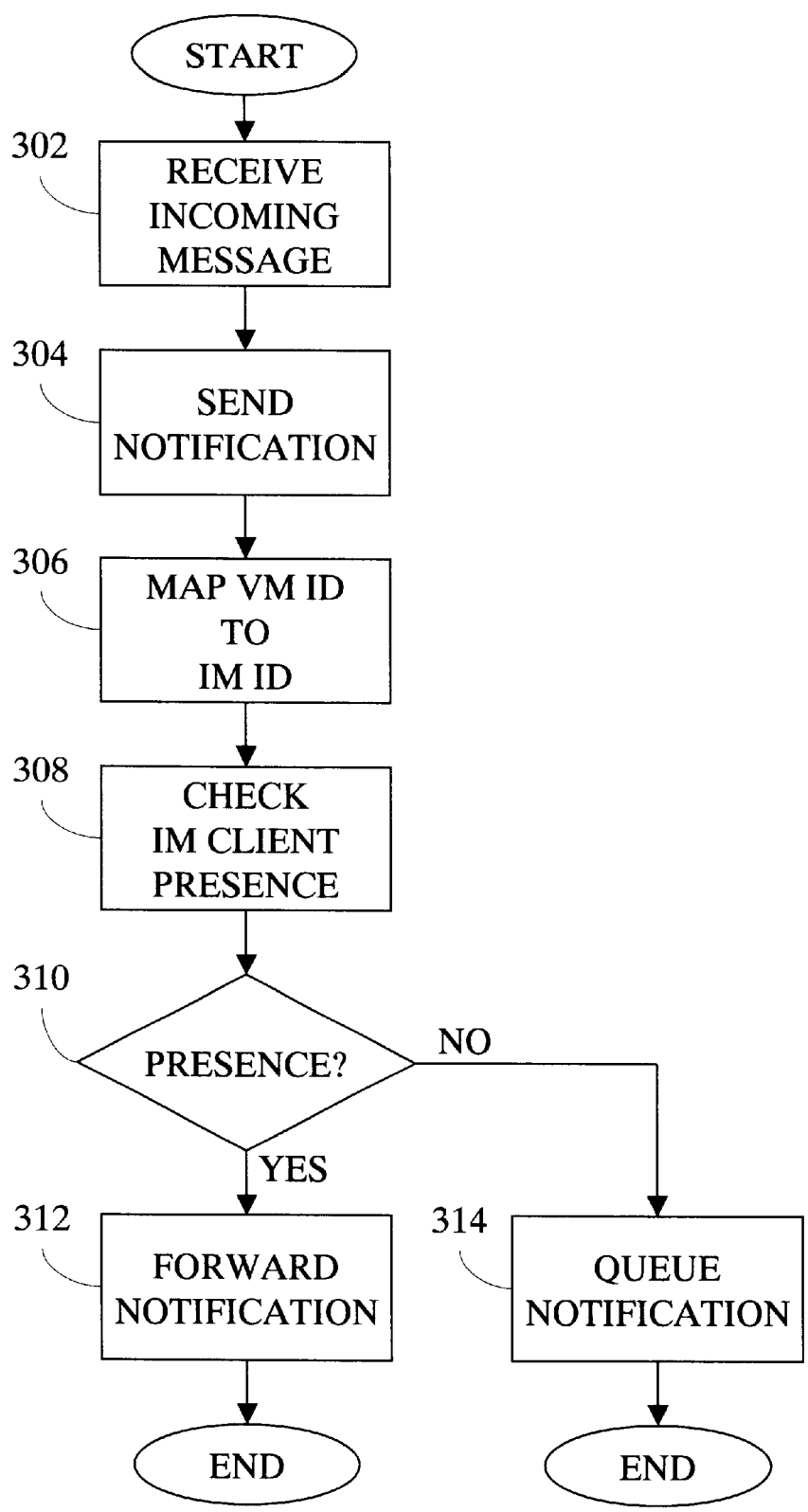
FIG. 3 is a flowchart showing exemplary steps involved in implementing a preferred embodiment of the invention.

FIG. 3 is a flowchart showing exemplary steps involved in implementing a preferred embodiment of the invention.

In step 302, an incoming message (e.g., voice, fax, or the like) intended for a voice mailbox subscriber is received at voicemail server 120.

In step 304, voicemail server 120 sends a notification to enhanced notification server 130. The notification may include a number of attributes associated with the incoming message including, for example, the date and time on which the incoming message was received, the identity of the sender of the incoming message, the length (or size) of the incoming message, and so on. The notification preferably includes a voice mailbox identification of the voice mailbox subscriber. The voice mailbox identification can be, for example, a telephone number associated with the voice mailbox subscriber.

In step 306, enhanced notification server 130 maps the voice mailbox identification (VM ID) to an instant messaging identification (IM ID). Note that both the VM ID and the IM ID belong to a common entity. The common entity is instant messaging client 160 that is also the voice mailbox subscriber for which the incoming message is intended. The IM ID can be, for example, an alphanumeric character string associated with instant messaging client 160.

In step 308, enhanced notification server 130 checks the presence status or availability of instant messaging client 160. Preferably, the IM ID is utilized in this step.

In step 310, if it is determined that instant messaging client 160 is present or available, the process goes to step 312; otherwise, the process goes to step 314.

In step 312, the notification is forwarded by enhanced notification server 130 to instant messaging client 160. Preferably, the notification is forwarded via instant messaging presence server 150.

In step 314, the notification is queued at enhanced notification server 130 for a later delivery until instant messaging client 160 is available.

Figure 4:
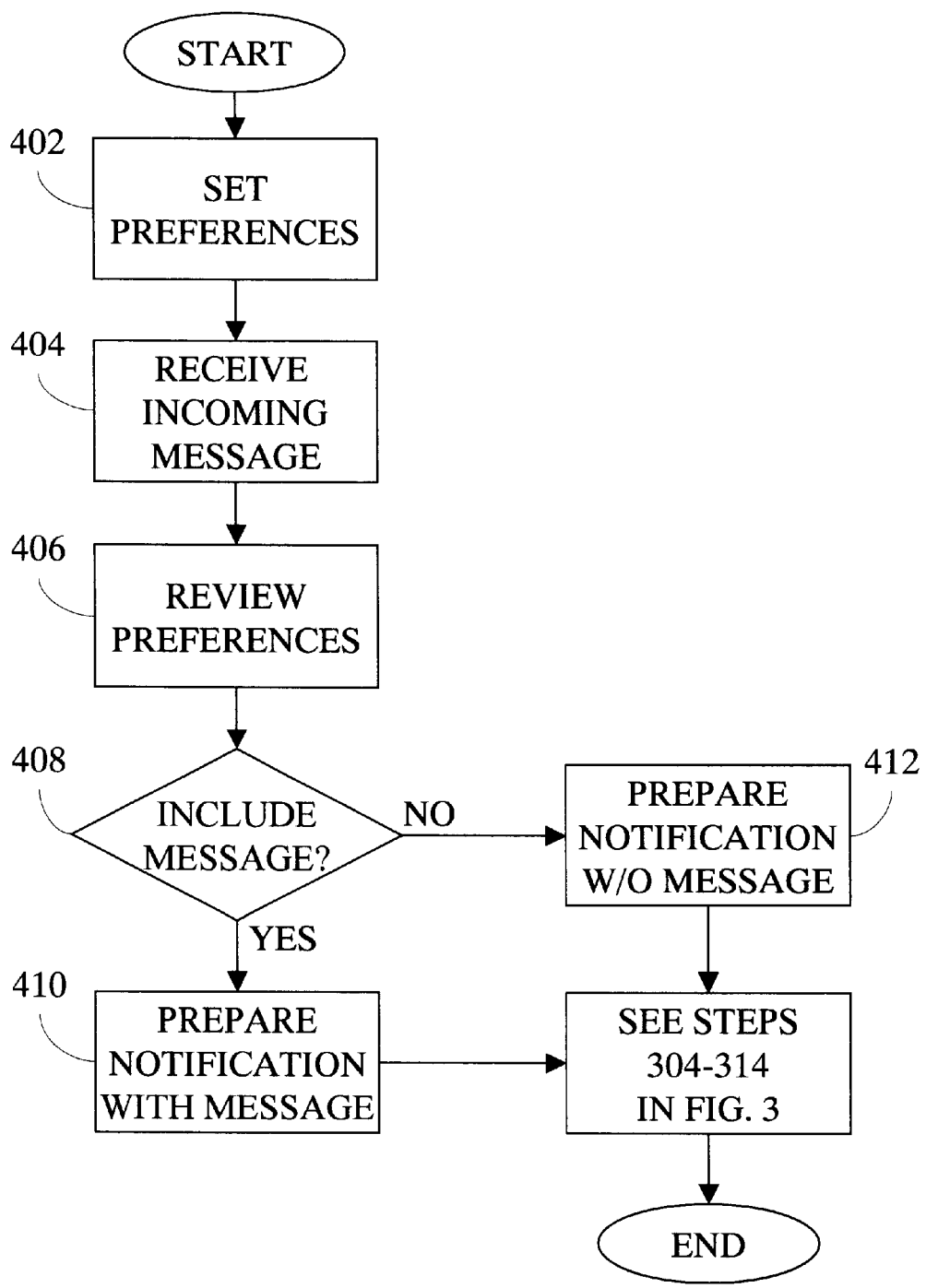
FIG. 4 is a flowchart showing exemplary steps involved in implementing another preferred embodiment of the invention.

FIG. 4 is a flowchart showing exemplary steps involved in implementing another preferred embodiment of the invention. In this embodiment, the invention enables a user of the invention, e.g., the voice mailbox subscriber or instant messaging client 160 discussed above, to receive the incoming message along with the notification. In this embodiment, voicemail server 120 is adapted to attach the incoming message to the notification.

In step 402, preferences are set. The preferences may include, for example, the user's desire to receive the incoming message in addition to the notification via instant messaging. Preferences are stored in a location that is accessible to voicemail server 120.

In step 404, voicemail server 120 receives an incoming message.

In step 406, voicemail server 120 reviews the preferences set in step 402.

In step 408, if the preferences have been set such a way that the user does not wish to have the incoming message attached to a notification, the process goes to step 412; otherwise, the process goes to step 410.

In step 410, voicemail server 120 prepares a notification with the incoming message attached to the notification.

In step 412, voicemail server 120 prepares a notification without the incoming message attached to the notification.

Following one of steps 410 and 412, steps generally similar to steps 304 through 314 shown in FIG. 3 and discussed above may be used to implement this embodiment.

Figure 5:
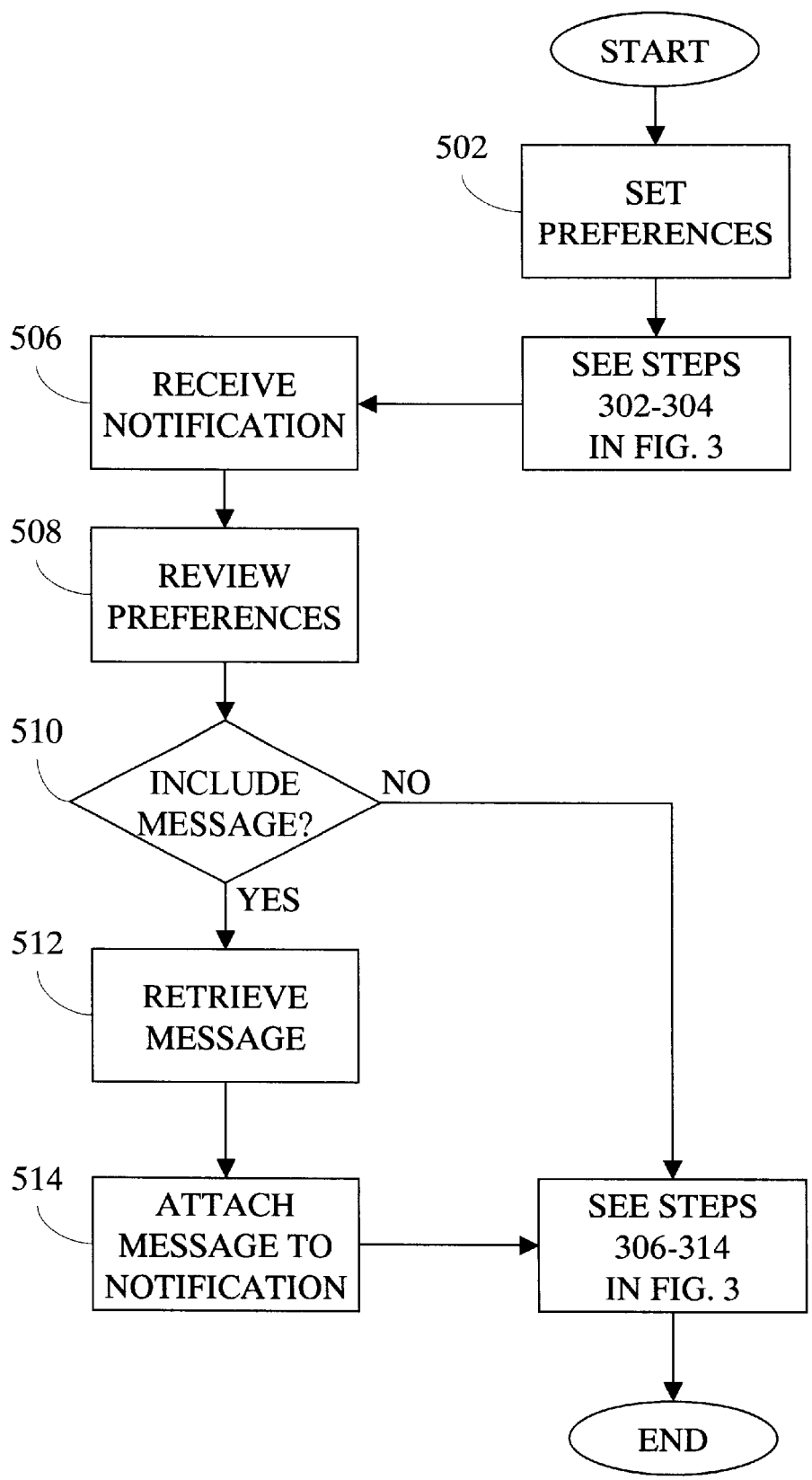
FIG. 5 is a flowchart showing exemplary steps involved in implementing another preferred embodiment of the invention.

FIG. 5 is a flowchart showing exemplary steps involved in implementing another preferred embodiment of the invention. In this embodiment, the invention enables a user of the invention to receive the incoming message along with the notification. In this embodiment, enhanced notification server 130 is adapted to retrieve the incoming message from voicemail server 120 and attach the incoming message to the notification.

In step 502, preferences are set. The preferences may include, for example, the user's desire to receive the incoming message in addition to the notification via instant messaging. Preferences are stored in a location that is accessible to enhanced notification server 130.

After step 502 but before step 506, steps generally similar to steps 302 through 304 shown in FIG. 3 and discussed above may be used to implement this invention.

In step 506, enhanced notification server 130 receives a notification from voicemail server 120 that an incoming message has been received by voicemail server 120.

In step 508, enhanced notification server 130 reviews the preferences set in step 502.

In step 510, if the preferences have been set such a way that the user does not wish to have the incoming message attached to the notification via instant messaging, the process goes to steps that are generally similar to steps 306 through 314 shown in FIG. 3 and described above. Otherwise, the process goes to step 512.

In step 512, enhanced notification server 130 communicates with voicemail server 120 to retrieve the incoming message.

In step 514, enhanced notification server 130 attaches the incoming message to the notification.

Following step 514, steps generally similar to steps 306 through 314 shown in FIG. 3 and discussed above may be used to implement this embodiment.

Figure 6:
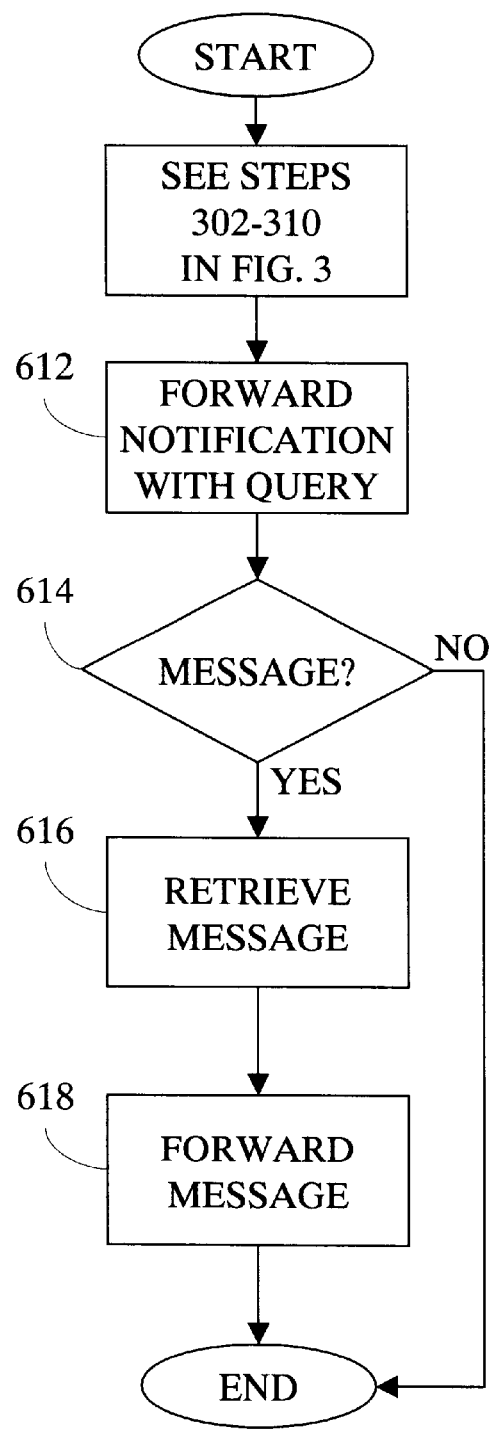
FIG. 6 is a flowchart showing exemplary steps involved in implementing another preferred embodiment of the invention.

FIG. 6 is a flowchart showing exemplary steps involved in implementing another preferred embodiment of the invention. In this embodiment, the invention enables a user of the invention to receive the incoming message via instant messaging after reviewing the notification. In this embodiment, enhanced notification server 130 is adapted to retrieve the incoming message from voicemail server 120 after receiving a respond from the user that the user wishes to receive the incoming message via instant messaging.

Steps similar to steps 302 through 310 shown in FIG. 3 and discussed above may be used to implement this embodiment.

Following step 310, in step 612, enhanced notification server 130 forwards the notification to the user. Here, the notification includes a query whether the user wishes to receive the incoming message via instant messaging.

If in step 614 the user responds with an affirmative answer, the process goes to step 616. Otherwise, the process ends.

In step 616, enhanced notification server 130 communicates with voicemail server 120 to retrieve the incoming message.

In step 618, after the incoming message is received from voicemail server 120, enhanced notification server 130 forwards the incoming message to the user via instant messaging.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   receiving a notification from a voicemail server by an enhanced notification server, wherein the notification comprises attributes associated with an incoming message intended for a voice mailbox subscriber of the voicemail server and a voice mail and a voice mailbox identification associated with the voice mailbox subscriber;
   upon receiving the notification, mapping the voice mailbox identification to an instant messaging identification of an instant messaging client, wherein the voice mailbox subscriber and the instant messaging client are a common entity, wherein the mapping step is performed by the enhanced notification server;
   querying an instant messaging presence server, using the instant messaging identification, to determine a presence of the instant messaging client, wherein the querying step is performed by the enhanced notification server; and
   forwarding the notification by the enhance notification server to the instant messaging client if the instant messaging presence server indicates that the instant messaging client is available.

2. The method of claim 1, further comprising extracting the voice mailbox identification from the notification and queuing the notification at the enhanced notification server for a later delivery if the instant messaging client is not available.

3. The method of claim 1, further comprising attaching the incoming message to the notification.

4. The method of claim 1, wherein the incoming message is one of a voicemail message and a fax message.

5. The method of claim 1, wherein the attributes comprise one or more of an identity of a sender of the incoming message, a date of the incoming message, a time of the incoming message, and a size of the incoming message.

6. The method of claim 1, wherein the voice mailbox identification is a telephone number associated with the voice mailbox subscriber.

7. The method of claim 1, wherein the instant messaging identification is an alphanumeric character string associated with the instant messaging client.

8. A system comprising:
   a voicemail server, wherein the voicemail server is configured to receive an incoming message intended for a voice mailbox subscriber and to send a notification based on the incoming message;
   an enhanced notification server in communication with the voicemail server, wherein the enhanced notification server is configured to receive the notification from the voicemail server, extract a voice mailbox identification associated with the voice mailbox subscriber and to map the voice mailbox identification to an instant messaging identification of an instant messaging client; and
   an instant messaging presence server in communication with the enhanced notification server, wherein the instant messaging presence server is configured to, upon receiving a query from the enhanced notification server, determine an availability of the instant messaging client based on the instant messaging identification,
   wherein when the voicemail server receives the incoming message, the voicemail server sends a notification to the enhanced notification server,
   wherein when the enhanced notification server receives the notification, the enhanced notification server queries the instant messaging presence server for the availability of the instant messaging client, and
   wherein the enhanced notification server forwards the notification to the instant messaging client if the instant messaging presence server indicates that the instant messaging client is available.

9. The system of claim 8, wherein the enhanced notification server queues the notification for a later delivery if the instant messaging client is not available.

10. The system of claim 8, wherein communications between the voicemail server and the enhanced notification server involves an IP networks.

11. The system of claim 8, wherein one of the voicemail server and the enhanced notification server is adapted to attach the incoming message to the notification.

12. The system of claim 8, wherein communications between the enhanced notification server and the instant messaging presence server involves an IP network.

13. The system of claim 8, wherein the incoming message is one of a voicemail message and a fax message.

14. The system of claim 8, wherein the notification is forwarded to the instant messaging client via the instant messaging presence server.

15. The system of claim 8, wherein the voice mailbox identification is a telephone number associated with the voice mailbox subscriber.

16. An enhanced notification server comprising:

a microprocessor adapted to receive a notification of an incoming message from a voicemail server, extract a voice mailbox identification from the notification, map the voice mailbox identification to an instant messaging identification, query an instant messaging presence server, using the instant messaging identification, to determine a presence of an instant messaging client associated with the instant messaging identification, forward the notification and the incoming message to the instant messaging client if the instant messaging presence server indicates that the instant messaging client is available.

17. The enhanced notification server of claim 16, wherein the notification relates to a receipt of an incoming message at the voicemail server.

18. The enhanced notification server of claim 16, wherein the microprocessor is further adapted to query the instant messaging client whether the incoming message should be forwarded via instant messaging.

19. The enhanced notification server of claim 16, wherein the microprocessor is further adapted to retrieve the incoming message from the voicemail server.

20. The enhanced notification server of claim 16, wherein the microprocessor is further adapted to forward the incoming message to the instant messaging client.

\* \* \* \* \*